June 30, 1959     C. J. B. DUCULOT     2,892,874
PROCESS FOR PURIFYING ALCOHOLS
Filed Feb. 18, 1957
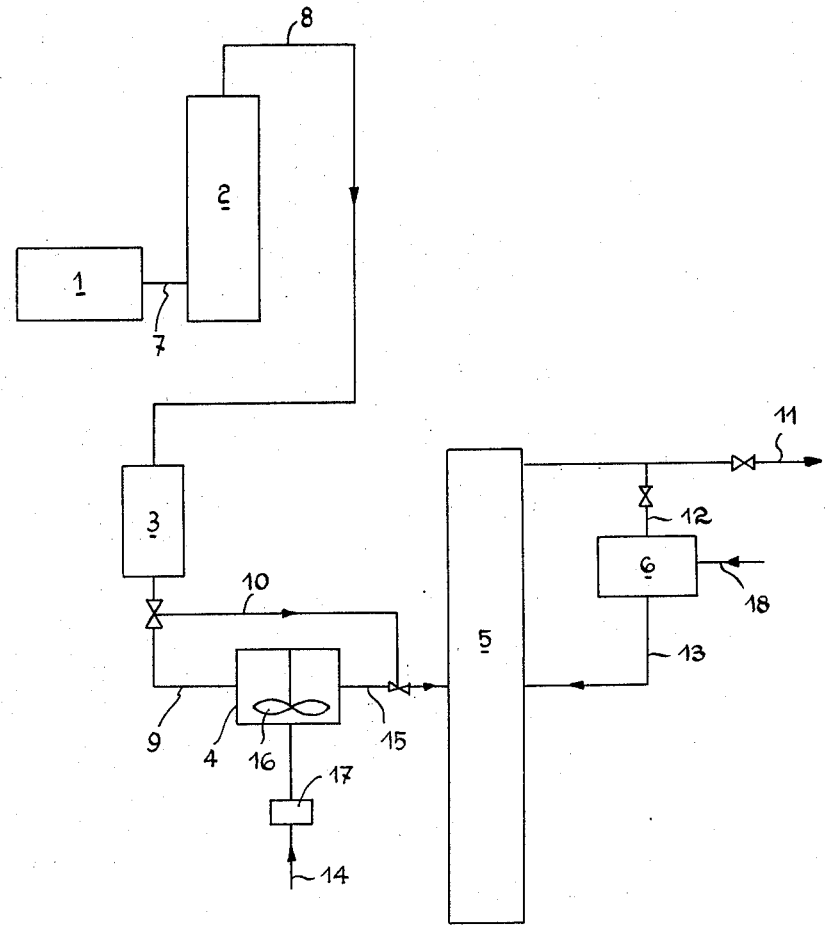
INVENTOR.
CAMILLE JEAN BAPTISTE DUCULOT
BY
                Irwin S. Thompson
                           ATTY.

United States Patent Office 2,892,874
Patented June 30, 1959

2,892,874

PROCESS FOR PURIFYING ALCOHOLS

Camille Jean Baptiste Duculot, Vitrival, Belgium

Application February 18, 1957, Serial No. 640,956

Claims priority, application Belgium February 21, 1956

4 Claims. (Cl. 260—643)

This invention relates to a process for purifying alcohols, such as fermentation ethyl alcohol and synthetic ethyl alcohol.

As known, ethyl alcohol prepared by fermentation and purified by distillation and rectification contains trace amounts of certain organic substances which may be detected by microchemical tests, such as the titration or analysis of the carbonyl (CO) function. These substances which are engaged in physico-chemical connections produce in the alcohol organoleptic deficiencies, which are perceptible by olfactive or gustative way.

In the known industrial processes, it is not possible to remove completely said organic substances which are present as impurities in ethyl alcohol. The removal of said impurities is not possible even by repeated rectifications and the alcohol which has been repeatedly rectified contains always minute quantities of said impurities perceptible by organoleptic way.

As known, ethyl alcohol obtained by a synthetic method also frequently contains substances having a carbonyl function, which alter the purity of said synthetic alcohol and are difficult to remove completely by the conventional methods.

Now, the present invention has for object to meet with said difficulties and relates to a process for purifying fermentation ethyl alcohol as well as synthetic ethyl alcohol, whereby an alcohol free from said deficiencies may be produced.

According to this invention, a sulphite of an alkaline metal is mixed to the alcohol to be purified, said sulphite is allowed to be in contact with said alcohol during a period sufficient for said sulphite reacting with the impurities of said alcohol and finally the mixture of sulphite and alcohol is subjected to at least one rectification.

Suitable sulphites of alkaline metals are, for example, sodium sulphite ($SO_3Na_2$, $7H_2O$), potassium sulphite ($SO_3K_2$, $2H_2O$), lithium sulphite and possibly ammonium sulphite. With regard to the ammonium sulphite, it may be used if the pH conditions allow such use.

The process according to this invention may be applied either to fermentation ethyl alcohol already rectified, either to phlegms resulting from the fermentation of fermented worts. In the first case the fermentation ethyl alcohol is subjected to at least one additional rectification when the sulphite has remained during a sufficient period in contact with said alcohol. In the latter case, the phlegms are subjected to at least one rectification after a suitable contact period between said sulphite and said phlegms.

The process according to this invention may also be applied to synthetic ethyl alcohol, in order to remove therefrom the detrimental substances, such as the substances having a carbonyl function.

The process according to this invention may be applied by several different ways, the essential varying parameters being as follows:

Alcohol concentration;
Weight of alkaline metal sulphite added per volume of alcohol;
Time of contact between sulphite and alcohol before final rectification;
Nature and grade of the used sulphite; pH conditions.

For each of these parameters, laboratory tests will easily permit to determine the optimum conditions for every type of phlegm or alcohol to be purified.

With regard to the concentration of the alcohol to be purified by admixture of an alkaline metal sulphite, this concentration is not critical. Thus, said sulphite may be added to phlegms or to already rectified and highly concentrated alcohols.

The amount by weight of alkaline metal sulphite to be admixed to the alcohol, in order to remove impurities therefrom, may also vary between wide limits and depends inter alia from the impurity content of the alcohol. Generally when a fermentation ethyl alcohol is to be treated, suitable results are obtained by adding a proportion of said sulphite comprised between 1 and 10% by weight per volume of the liquid to be treated. When the process is applied to synthetic ethyl alcohol, the proportion of sulphite to be added to said alcohol may be substantially higher. This weight proportion of sulphite may be of 3% or more per volume of the liquid to be treated.

The contact period between the alkaline metal sulphite and the alcohol to be purified may also vary and depends inter alia from the impurity content of said alcohol. Under certain circumstances, this contact period is preferably of about ten hours.

It is to be understood that the alkaline metal sulphite used for purifying an ethyl alcohol has to be as pure as possible. If said sulphite is not pure, impurities are likely to be introduced in the alcohol to be purified.

Finally, particularly when the process according to this invention is applied to yeast phlegms, controlled pH conditions are suitably applied. A weak non volatile acid and or a buffer, for example a mixture of monosodium phosphate and bisodium phosphate or a mixture of sulphuric acid and bisodium phosphate, is preferably added, for maintaining the pH in the vicinity of the neutral point (pH=7). When ammonium sulphite is used as a purifying agent, the pH must be maintained at a value inhibiting the evolution of ammonia vapours.

The process according to this invention is illustrated by the annexed schematic drawing, which shows a plant for the production of fermentation ethyl alcohol.

A fermented wort is supplied from a tank 1 through a conduit 7 to a distillation apparatus 2. At the upper part of this apparatus 2 vapours of alcohol of 70° Gay-Lussac are collected. These vapours are condensed and supplied through a conduit 8 in the tank 3. From this tank, the phlegm is sent through a conduit 9 into a mixing vessel 4. An alkaline metal sulphite, such as sodium sulphite, is introduced at 14 from a distributor 17 into said vessel 4 provided with a mixer 16 for maintaining a homogeneous mixture of said sulphite with the phlegm in the vessel 4 during a suitable period (for example, about 10 hours). Subsequently, the mixture of sulphite and phlegm is introduced in a rectification device 5. At the outlet of this rectification device 5, a purified alcohol of 96° Gay-Lussac is obtained, said purified alcohol being discharged through the conduit 11.

In place of supplying the phlegm (70° Gay-Lussac) through the conduit 9 to the mixing vessel 4, this phlegm may be sent through the conduits 10 and 15 to the rectification device 5. The concentrated alcohol (96° Gay-Lussac) obtained at the upper part of this rectification device is supplied through the conduits 11 and 12 to a tank 6, in which said alcohol is diluted to the appropriate concentration for the rectification column 5 and in which a suitable quantity of an alkaline metal sulphite is introduced at 18. In this case, the concentrated alcohol (96° Gay-Lussac) is recycled in admixture with the sulphite through the conduit 13 into the rectification device 5. A purified concentrated alcohol (96° Gay-Lussac) is obtained at the outlet of said device 5.

The following examples illustrate an embodiment of the process according to this invention.

*Example I*

The starting material is a molasses ethyl alcohol having the following characteristics:

Concentration: 96° Gay-Lussac

Barbet test: 12 minutes

Microchemical analysis: carbonyl function (CO); $2.12\gamma$/cc., i.e. 0.212 gr./hectolitre. From these $2.12\gamma$/cc., $1.02\gamma$/cc. result from the acetylcethylcarbinol and $1.10\gamma$/cc. from the carbonyl function of various aldehydes and ketones;

Organoleptic characters: very hard alcohol with disagreeable taste and smell.

To this alcohol previously diluted to 70° Gay-Lussac are added 10% (10 gr./1000 cc.) by weight of pure sodium sulphite ($SO_3NA_2$, $7H_2O$) per volume of alcohol. After a contact period of 10 hours between sulphite and alcohol, the mixture is subjected to a rectification. In the head portion or fraction of this rectification, the carbonyl groups are almost quantitatively collected.

The middle or heart fraction of said rectification consists in an excellent alcohol having the following properties:

Concentration: 96° Gay-Lussac

Barbet test: 82 minutes

Microchemical analysis: entirely free from carbonyl function and particularly from acetylmethylcarbinol;

Organoleptic characteristics: very mellow alcohol having neutral smell and taste.

The same results have been obtained by treating the same alcohol with other sulphites, such as potassium sulphite.

*Example II*

In this example, synthetic ethyl alcohol was used as starting material. This alcohol was undrinkable and contained $4\gamma$/cc. of carbonyl function (C=O).

To 100 cc. of said alcohol previously diluted to 70° Gay-Lussac, 3 gr. of pure sodium sulphite ($SO_3Na_2$, $7H_2O$) are added. The mixture is shaken during a suitable period and is thereafter distilled. This distillation gives a head fraction (5 cc.) containing all the C=O groups, heart (90 cc.) and tail (5 cc.) fractions free from C=O groups.

The alcohol obtained is perfectly drinkable.

If necessary, the alcohol to be purified may be repeatedly subjected to the treatment with an alkaline metal sulphite according to this invention.

What I claim is:

1. A process for purifying ethyl alcohol containing carbonyl groups consisting in adding to said alcohol an alkali metal sulphite in solid form selected from the group consisting of sodium sulphite, potassium sulphite, lithium sulphite, and ammonium sulphite to form a solution of said sulphite in said alcohol, stiring the solution for several hours, and then subjecting the solution to at least one rectification to obtain a minor head fraction containing all the carbonyl groups and a major heart fraction containing pure ethyl alcohol.

2. A process for purifying a rectified fermentation ethyl alcohol containing carbonyl groups consisting in adding to said alcohol an alkali metal sulphite in solid form selected from the group consisting of sodium sulphite, potassium sulphite, lithium sulphite, and ammonium sulphite to form a solution of said sulphite in said alcohol, stirring the solution for several hours, and then subjecting the solution to at least one rectification to obtain a minor head fraction containing all the carbonyl groups and a major heart fraction containing pure ethyl alcohol.

3. A process for obtaining pure ethyl alcohol from phlegms containing carbonyl groups obtained by distillation of fermented worts consisting in adding to said alcohol an alkali metal sulphite in solid form selected from the group consisting of sodium sulphite, potassium sulphite, lithium sulphite, and ammonium sulphite to form a solution of said sulphite in said phlegms, stirring the solution for several hours, and then subjecting the solution to at least one rectification to obtain a minor head fraction containing all the carbonyl groups and a major heart fraction containing pure ethyl alcohol.

4. A process for purifying a rectified fermentation ethyl alcohol consisting in adding to said alcohol an alkali metal sulphite in solid form selected from the group consisting of sodium sulphite, potassium sulphite, lithium sulphite, and ammonium sulphite to form a solution of said sulphite in said alcohol containing 1% to 10% by weight of said sulphite, stirring said solution for about 10 hours, and then subjecting the solution to at least one rectification to obtain a minor head fraction containing all the carbonyl groups and a major heart fraction containing pure ethyl alcohol.

References Cited in the file of this patent

UNITED STATES PATENTS

| 432,198 | Guignard | July 15, 1890 |
| 2,696,463 | Baevsky | Dec. 7, 1954 |